(12) United States Patent
Knapp

(10) Patent No.: US 6,789,573 B2
(45) Date of Patent: Sep. 14, 2004

(54) DELIVERY CONTROL DEVICE FOR THE SUPPLY TO HYDRAULIC APPARATUSES

(76) Inventor: Francesco Knapp, Via Giacomo Leopardi 28, Cava Manara (Pavia) (IT)

( * ) Notice: Subject to any disclaimer, the term of this patent is extended or adjusted under 35 U.S.C. 154(b) by 92 days.

(21) Appl. No.: 10/204,378

(22) PCT Filed: Nov. 29, 2000

(86) PCT No.: PCT/EP00/11957
§ 371 (c)(1),
(2), (4) Date: Nov. 15, 2002

(87) PCT Pub. No.: WO01/66986
PCT Pub. Date: Sep. 13, 2001

(65) Prior Publication Data
US 2003/0145889 A1 Aug. 7, 2003

(30) Foreign Application Priority Data
Mar. 7, 2002 (IT) ..................................... TO2000A0211

(51) Int. Cl.$^7$ ............................................ F16K 11/074
(52) U.S. Cl. ............. 137/625.15; 137/597; 137/625.41; 137/315.15
(58) Field of Search .......................... 137/597, 625.11, 137/625.12, 625.15, 625.41, 270, 269, 315.15, 876

(56) References Cited
U.S. PATENT DOCUMENTS

| | | | |
|---|---|---|---|
| 3,072,136 A | * | 1/1963 | Roos ........................... 137/197 |
| 3,124,162 A | * | 3/1964 | Cameron ................ 137/625.11 |
| 3,385,321 A | | 5/1968 | Ehrens et al. .......... 137/625.46 |
| 3,773,078 A | * | 11/1973 | Suntheimer ............ 137/625.11 |
| 4,022,242 A | | 5/1977 | Turecek .................. 137/625.41 |
| 4,580,600 A | * | 4/1986 | Mazzei et al. .............. 137/597 |
| 5,425,394 A | * | 6/1995 | Clare .......................... 137/270 |
| 5,775,373 A | | 7/1998 | Pawelzik et al. ...... 137/625.46 |
| 5,950,576 A | * | 9/1999 | Busato et al. ............ 123/41.08 |

FOREIGN PATENT DOCUMENTS

| | | |
|---|---|---|
| DE | 19602106 | 7/1997 |
| EP | 0063627 | 11/1982 |
| EP | 0801255 | 10/1997 |

* cited by examiner

*Primary Examiner*—Stephen M. Hepperle
(74) *Attorney, Agent, or Firm*—Wood, Herron & Evans, LLP

(57) ABSTRACT

A delivery control device, intended to allow the control of the supply to several hydraulic apparatuses to achieve activation of these individually or in various combinations, including a pair of shutter plates, one fixed and one moveable, of which the fixed shutter plate offers a central inlet passage aperture and several peripheral delivery passage apertures, each of these having essentially the form of a sector of a circle and all of them together occupying no more than one third of the circle of the peripheral region of the fixed shutter plate, while the moveable shutter plate offers a central inlet passage aperture, a single peripheral delivery passage aperture, of a form which essentially corresponds to that of one of the delivery passage apertures of the fixed shutter plate and, in a position at least approximately diametrically opposite to this single delivery passage aperture, a collective delivery passage aperture of a form which essentially corresponds to the whole form of two or more delivery passage apertures adjacent to the fixed shutter plate.

19 Claims, 4 Drawing Sheets

DELIVERY CONTROL DEVICE FOR THE SUPPLY TO HYDRAULIC APPARATUSES

The subject of this invention is a delivery control device, intended to allow the control of the supply to several hydraulic apparatuses to achieve activation of these individually or in various combinations.

In hydraulic engineering the problem arises of allowing a user to direct the supply individually to one or another of several delivery apparatuses, with the possibility of also directing the supply collectively to more than one apparatus in accordance with combinations chosen by the user.

A frequent example of this requirement concerns multiple shower installations, which generally include an overhead shower, a hand-held shower and one or more groups of side showers called "body jet". The user should be able, via a mixing device for hot or cold water, if possible by a single or thermostatic control, which supplies water mixed to the temperature required by the user, to supply one or another of these showers or various combinations of them. This can obviously be done by using several valves, each of which controls a shower or group of showers, but it proves to be a difficult and awkward manoeuvre for the user. For this reason switching devices are used, but the switching devices supplied by the known engineering industry do not allow a wide choice of combinations; usually the user may choose between supply to the upper shower or to the lateral jets, or between the overhead shower and the hand-held shower, while it is not possible for him to supply only the side showers, or to choose between different groupings of these, nor to have delivery from all the showers, or from various combinations of these. In addition, the known switching devices do not generally allow the delivery to be cut off. This has to be achieved by a less accessible, separate manoeuvre, while it would be useful for the user to be able to accomplish this easily, especially to cut off the supply temporarily.

A second problem, which occurs for manufacturers of cartridges for hydraulic apparatuses, is that the purchasers, generally companies manufacturing taps and fittings, wish to apply to the control pins of the cartridges handles which they design or produce themselves, such as control knobs, knobs, long or short levers and so on. The means by which these handles are attached to the control pins of the cartridges are not uniform, and therefore present many different diameters and profiles, and require attachment to the control pins of the cartridges at distances which are also different from the body of the cartridges. This compels the manufacturers of the cartridges to produce each type of cartridge, intended for different purchasers, in several models with control pins suitable for receiving different handles. The control pins of these cartridges must therefore in their turn be made in several different forms, while many other parts of the cartridges may be of uniform construction. Nevertheless, according to known engineering practice, the control pin of a cartridge is made in a single piece with an internal rotating element, of a more or less complex structure, and therefore the whole assembly consists of the control pin and the internal rotating element which must be made in different forms, thus entailing considerable cost.

A third problem which often occurs in the technology of hydraulic installations is that of ensuring limitation of the maximum flow rate which can be delivered by the installation. This requirement can simply be due to a need for economy but in certain cases it is also required by the regulations.

The main aim of this invention is to provide a rational solution to the first of the problems mentioned above by producing a delivery controller which enables the supply to be directed to each one of a group of delivery apparatuses individually, or collectively to various combinations of these which are more numerous than those permitted by a normal controller, or even, if necessary, to all the possible combinations of these delivery apparatuses. It is also an aim of the invention to enable a delivery controller to be produced which will also enable the delivery to be cut off. It is a further aim of the invention to enable a delivery controller to be produced by essentially simple means and at moderate cost.

A second aim of the invention is to make a real contribution to the economics of production of such a delivery controller, especially in the form of a cartridge, to enable limitation of the costs mentioned above relating to the lack of uniformity of the handles.

A third aim of the invention is to enable easy insertion into such a delivery controller of means of limiting the maximum flow rate of delivery allowed, when such a limitation is required or imposed.

The first aim of the invention is achieved by means of using, in an apparatus or cartridge consisting of a delivery controller, a pair of shutter plates, one fixed and one moveable, in which the fixed shutter plate offers several peripheral delivery passage apertures, each of which having essentially the form of a sector of a circle and which together occupy no more than one third of the circle of the peripheral region of the fixed shutter plate, while the moveable shutter plate offers a single peripheral delivery passage aperture of a form which essentially corresponds to that of one of the delivery passage apertures of the fixed shutter plate and, in a position at least approximately diametrically opposed to this single delivery passage aperture, a collective delivery passage aperture of a form which essentially corresponds to the overall form of two or more delivery passage apertures adjacent to the fixed shutter plate.

If necessary, either the fixed shutter plate or the moveable shutter plate may also have a central inlet aperture.

This structure can be produced at low cost and offers the possibility of positioning the two shutter plates in relation to each other so that the delivery can be intercepted; from this position and still rotating the moveable shutter plate in a given direction the delivery can be directed in succession individually to each of the delivery apparatuses and then still turning the moveable shutter plate in the same direction, the delivery can be directed collectively to two or more delivery apparatuses, in a succession of appropriately-arranged combinations. By varying the number of delivery passage apertures in the fixed shutter plate it is possible to regulate any number of delivery apparatuses and to achieve any desired combination for collective delivery.

These passage apertures on the fixed shutter plate are crosswise, while the passage apertures of the moveable shutter plate mentioned above may be crosswise, since the moveable shutter plate is then linked to a rotating element consisting of a chamber which connects these passage apertures by establishing a seal towards the exterior, or these passage apertures on the moveable shutter plate may not be crosswise (or may consist of cavities) and be connected to each other.

The control device in the invention may be made either by mounting the parts directly in a body in the apparatus, or in the form of a cartridge intended to be inserted in the body of an apparatus.

The second purpose referred to (which is of interest mainly when the control device is in the form of a cartridge) is achieved, in accordance with this invention, when the moveable shutter plate of the delivery control is connected to a rotating element which does not itself have a control pin, and which offers instead a means of connection, and when a control pin is made separately from the rotating element and offers an internal means of connection in addition to the means of connection offered by the internal rotating element, and an external means of connection suitable for the requirements of a handle for which the delivery control is made.

Preferably these means of connection of the rotating element and the control pin consist of portions of the section which is not entirely circular, especially splined or prismatic sections or circular sections interrupted by projections, hollows or flats, which, when used together, can transfer a rotating movement from the control pin to the rotating element.

In this way, even the rotating element of the delivery control can be uniform, like many other parts of it, and offer a uniform means of connection, while the necessity of providing different control pins to satisfy the different demands of purchasers is satisfied by making parts which are different from each other and which carry only the control pins, and which all have the uniform means of connection to the rotating element, and differing in the characteristics of their form and external dimensions corresponding to those required by the handles for which the device is made. The higher production costs caused by the impossibility of having all the devices uniform are thus considerably reduced.

It is an advantage that the control pin of the cartridge is such that it can be inserted into the rotating element during the assembly of the device, directed from the inside towards the outside, and it is fixed in its axial position by means of a fixing device such as an elastic ring inserted into the external part of the control pin after it has been connected to the rotating element.

The third purpose of the invention can be achieved if required due to the fact that the control pin contains within it a plunger which by means of a threaded part can be arranged in an axially adjustable position opposite the central inlet passage aperture of the moveable shutter plate for the purpose of regulating the maximum flow rate value which can be delivered by the delivery control.

These and other characteristics, aims and advantages of the subject of this invention will be clarified by the following description of some forms of embodiment, consisting of non-limiting examples, with reference to the attached drawings, in which.

Figure 1:
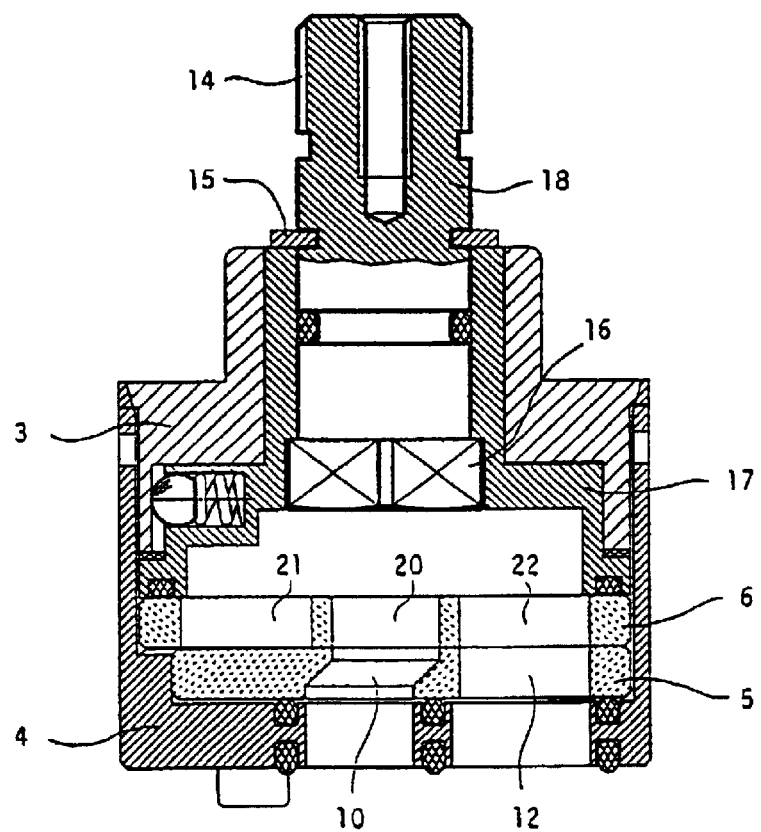
FIG. 1 shows in section a delivery control made as a realisation of this invention, in the form of a cartridge.

The delivery control illustrated in FIG. 1 is made in the form of a cartridge which is intended to be introduced into the body of a hydraulic apparatus designed for this purpose, but the delivery control may be made by mounting the parts directly in the body of a hydraulic apparatus: the modifications to be made in this case will be evident to a person skilled in this field.

The cartridge shown in FIG. 1 has a body consisting of two complementary parts 3 and 4, in which are housed a fixed shutter plate 5, which operates together with body 3–4, and a moveable shutter plate 6, operating together with a rotating element 17. This rotating element 17 does not itself have a control pin and instead offers a means of connection 16, which may consist of a toothed or prismatic area or even an area with projections, hollows or level planes which modify a circular section so as to make it suitable for transmitting a rotation, and which may simply consist of a structure of the rotating element 17, or it may consist of a metal insert applied to the rotating element 17. It is a particular advantage if the metal insert is formed at the same time as the rotating element 17 is made in plastic material.

On the other hand, a control pin 18 made separately from the moveable element 17 can be introduced into it, during assembly of the device, going from the interior towards the exterior, and offers internal means of connection 16 in addition to those offered by the moveable element 17, and external means of connection 14 intended to receive the application of a handle. In the figures, the connecting elements of the moveable element 17 and of the pivot pin 18 are shown as connected, and therefore are not distinguishable from each other and are designated by the same reference 16. Also the internal means of connection 16 of the control pin 18 may consist of structures of the control pin 18 or, if necessary and if the control pivot 18 is not itself metallic, they may consist of a metal insert.

In addition, the control pin 18 may offer on its exterior a ring-shaped seating suitable for receiving an elastic ring 15, or other appropriate device, which fixes its position axially in relation to the moveable element 17, while the positive rotation between these two parts is provided by the means of connection 16 used together. Therefore, once the device has been ambled the control pin 18 behaves in the same way as if it were made in a single piece with the rotating element 17. As may be understood, the pivot pin 18, and this alone, may be made in various forms and dimensions, so that the external means of connection 14 are suitable to receive the application of a corresponding handle, of varying shape, while the rotating element 17 with its means of connection 16 becomes one of the parts of the device which may be uniform in construction.

The elastic ring 15 previously mentioned may not be present in cases where the means of connection 16 are shaped so as to be, on their own, capable of ensuring the axial solidarity between the rotating element 17 and the control pin 18. This may be achieved particularly efficiently when a metal insert, which constitutes the means of connection 16, is formed at the same time as the rotating element 17 is made in plastic material.

The structures now described aimed at allowing adjustment of the delivery control to the application of handles of various characteristics are especially important when the delivery control is made in the form of a cartridge. On the other hand, when the delivery control is made by mounting its parts directly in the body of an apparatus, these structures offer benefit only in certain cases. Apart from these cases, the rotating elements and its control pin may be made in a single piece according to usual practice.

Figure 2:
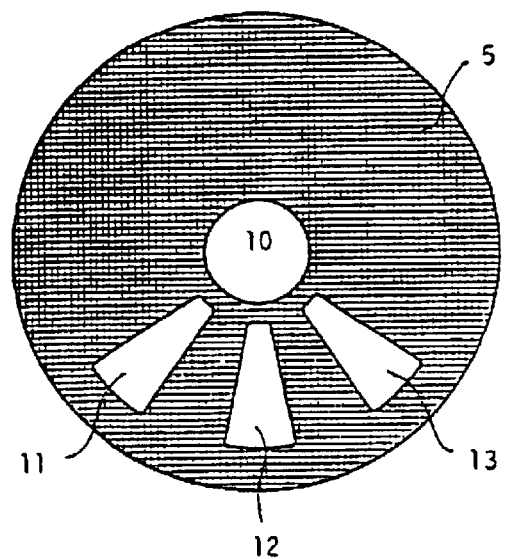
FIG. 2 shows a plan view of an example of a fixed shutter plate which can be used in the delivery control as shown in the invention.

As may be observed in FIG. 2, in this example of embodiment the fixed shutter plate 5 offers a central inlet passage aperture 10 and a certain number of passage apertures for peripheral delivery, three in this example, 11, 12 and 13. Each of these delivery passage apertures 11, 12 and 13 has essentially the form of a sector of a circle, and the whole occupies a total angle no greater than $\frac{1}{3}$ of a circle.

Each of the delivery passage apertures 11, 12 and 13 is intended to communicate, from the body of the delivery control, with one of the delivery devices which must be regulated, while the central inlet passage aperture 10 is intended to communicate with an apparatus which provides the water supply, such as a mixing device, possibly thermostatic.

Figure 3:
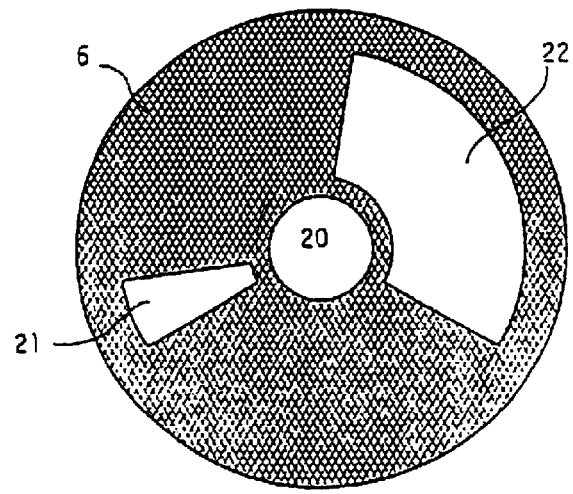
FIG. 3 shows a plan view of a moveable shutter plate suitable for use in association with the fixed shutter plate shown in FIG. 2.

As may be observed from FIG. 3, in this example of embodiment the moveable shutter plate 6 offers a central inlet passage aperture 20, a single peripheral delivery passage aperture 21, the form of which is essentially the same as that of one of the delivery passage apertures 11, 12 and 13 of the fixed shutter plate 5, and in a peripheral position at least approximately diametrically opposed to the single delivery passage aperture 21, a collective delivery passage aperture 22, the form of which corresponds to the form of the entire outline of two or more delivery passage apertures 11, 12 and 13 adjacent to the fixed shutter plate 5; in this example, this corresponds to the outline of all the delivery passage apertures 11, 12 and 13 of the fixed shutter plate 5.

The passage apertures 10 to 13 of the fixed shutter plate 5 are always crosswise. In the form of embodiment shown, the passage apertures 20 to 22 of the moveable shutter plate 6 are also crosswise, and the rotating element 17 forms a chamber, sealed towards the exterior, which connects together the passage apertures of the moveable shutter plate 6. Nevertheless, in a way which is itself well-known, the passage apertures of the moveable plate 6 could also not be crosswise, or could consist of hollows and could communicate directly with each other.

The above-mentioned central apertures 10 and 20 could also be absent if the incoming water is in any way carried above the shutter plates 5 and 6, for example by means of a lateral supply. In this case, the passage apertures of the moveable shutter plate 6 must be crosswise.

The behaviour of the shutter plates 5 and 6 described will now be clarified with reference to FIGS. 4 to 11. Naturally, the inlet passage apertures 10 and 20 (when they exist), being central, still correspond, while the relationships between the peripheral passage apertures vary with the rotation of the moveable shutter plate 6, caused by the moveable element 17 under the action of the control pin 18 to which the handle is connected.

Figure 4:
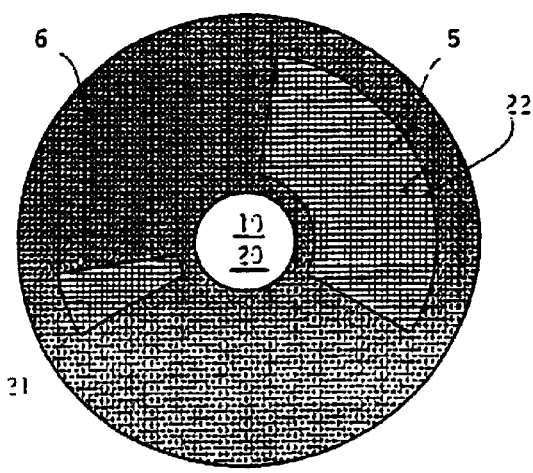
FIGS. 4 to 11 show the two shutter plates, fixed and moveable, as in FIGS. 2 and 3, one above the other and arranged in various operating positions.

As shown in FIG. 4, the plates 5 and 6, placed one above the other in the same relative positions as in FIGS. 2 and 3, do not offer any correspondence between the respectively delivery apertures. In this way the delivery can be intercepted. The relative positions as in the subsequent figures are achieved progressively, by rotating the moveable plate 6 each time by an angle equal to the angular distance between two adjacent peripheral delivery apertures 11, 12 and 13 of the fixed shutter plate 5.

Figure 5:
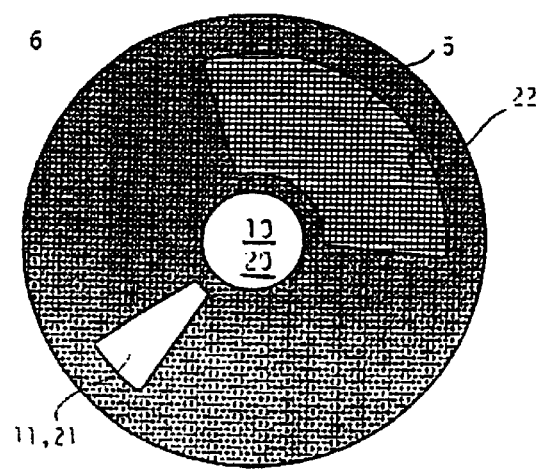
Figure 6:
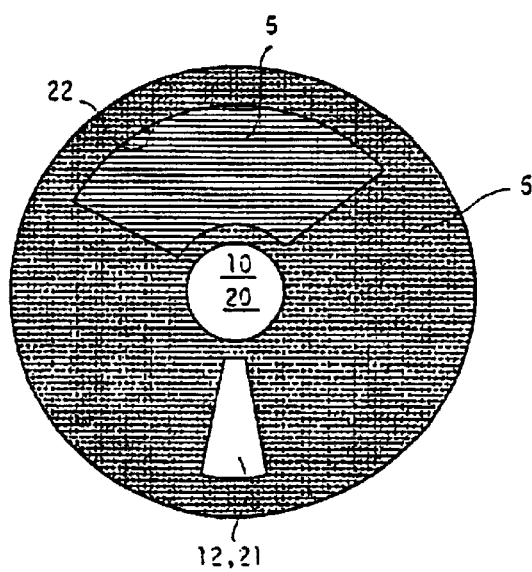
Figure 7:
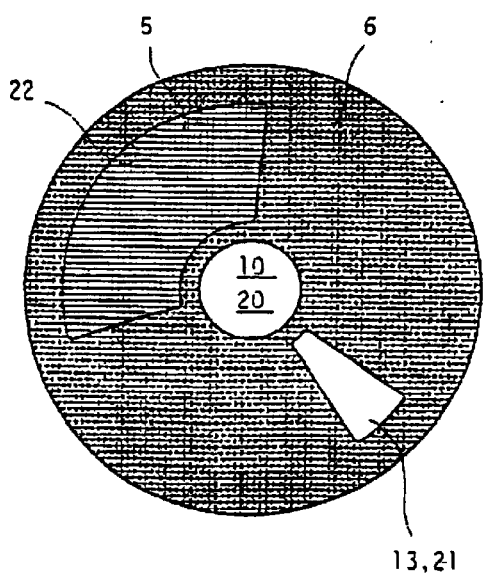

So, in the positions shown in FIGS. 5, 6 and 7 the single delivery aperture 21 of the moveable shutter plate 6 must correspond, respectively, with the delivery aperture 11, 12 or 13 of the fixed shutter plate 5. Therefore the delivery apparatuses respectively connected to the delivery apertures 11, 12 and 13 of the fixed shutter plate 5 are supplied individually, in succession.

Figure 8:
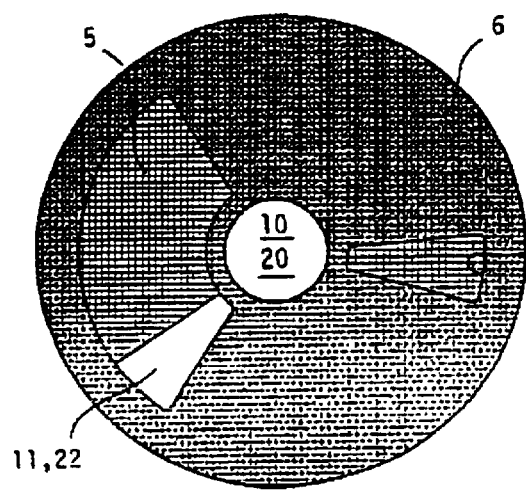
Figure 9:
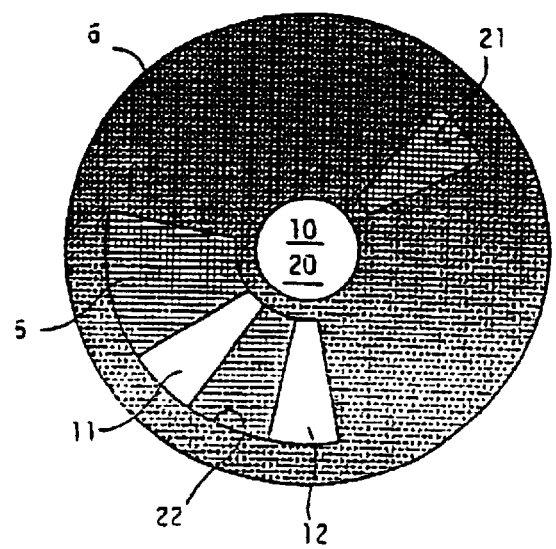
Figure 10:
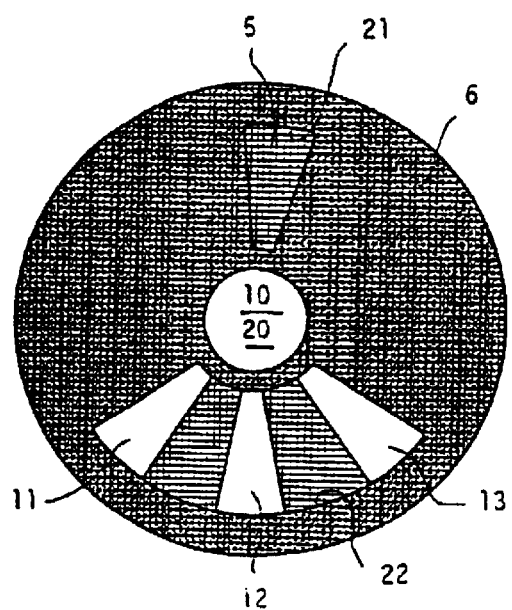
Figure 11:
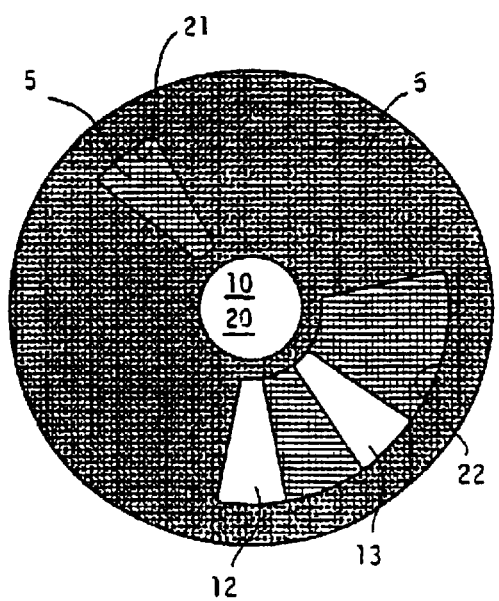

In the position shown in FIG. 8, the single supply to the delivery apparatus connected to the delivery aperture 11 is repeated, this time however by the collective delivery aperture 22 of the moveable shutter plate 6. Then the collective supply positions begin. In FIG. 9, the collective delivery aperture 22 of the moveable shutter plate 6 uncovers the delivery apertures 11 and 12 of the fixed shutter plate 5, thus supplying collectively the delivery apparatuses connected to these delivery apertures. In FIG. 10, the collective delivery aperture 22 of the moveable shutter plate 6 uncovers all the delivery apertures 11, 12 and 13 of the fixed shutter plate 5, thus collectively supplying all the delivery apparatuses connected to these delivery apertures, or all the delivery apparatuses governed by the control. In FIG. 11, however, the collective delivery aperture 22 of the moveable shutter plate 6 uncovers the delivery apertures 12 and 13 of the fixed shutter plate 5, thus supplying collectively only the delivery apparatuses connected to these delivery apertures. Continuing the rotation, if this were possible, the direct supply to the single delivery aperture 13 would follow, and it would then return to the intercept position. However, this rotation path may not be considered useful, and in this case it may be hindered by limiting the rotation of the moveable shutter plate 6.

As may be understood, even with a simple form of embodiment such as that illustrated, the single and collective delivery combinations which can be achieved are much more numerous than those allowed by a known switch. However, it is naturally possible to increase the number of delivery apertures offered by the fixed shutter plate 5, even if it is necessary to leave some of these unused or connected to each other, either to regulate a greater number of delivery apparatuses or to achieve even greater combinations for collective delivery. On the other hand, it is possible to make the width of the collective delivery aperture 22 of the moveable shutter plate 6 correspond to a part of the delivery apertures of the fixed shutter plate, rather than to all these apertures, so as to modify the collective delivery combinations obtained. This allows the designer the maximum freedom of choice for the functions of the delivery control in the invention.

A trigger device 19 may be provided to assist the user in locating the various operating positions of the delivery control. This trigger device acts between the rotating element 18 and the body 3–4 of the cartridge to stabilise the correct positions selected, or of all the possible positions only those which are useful. Alternatively, if such a device is not provided, the user still has the possibility of regulating the flow rate of some delivery apparatuses by rotating the moveable shutter plate 6 so as to uncover only partially the corresponding delivery passage apertures of the fixed plate 5.

Figure 12:
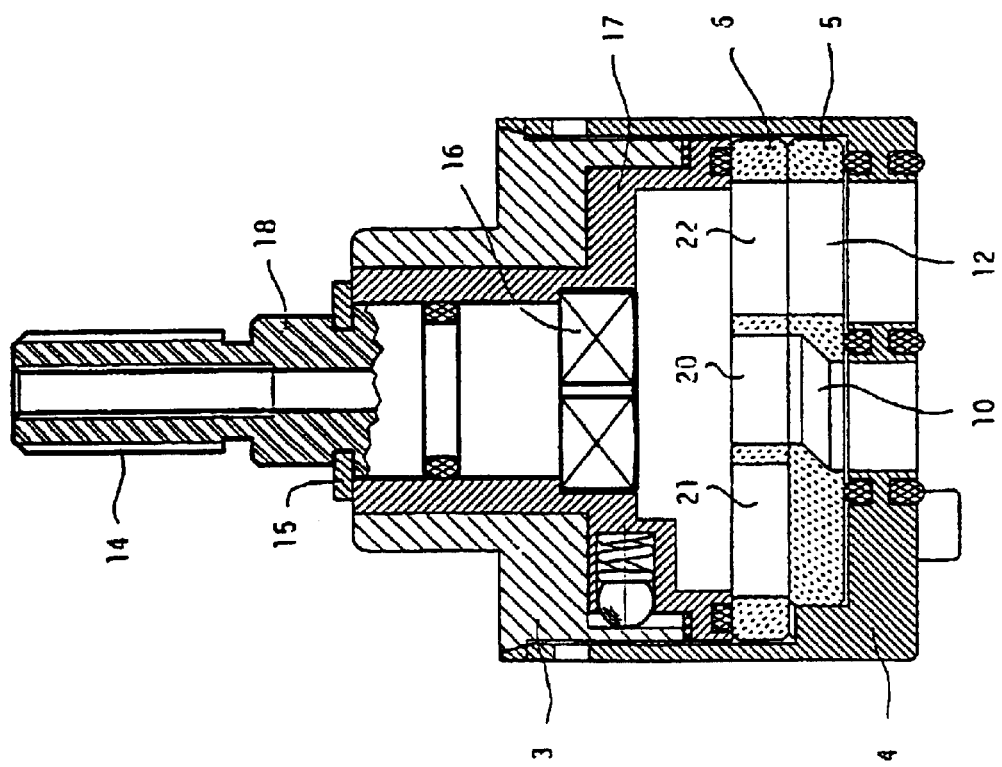

FIG. 12 shows how, because of the structural separation between the moveable element 17 and the control pin 18, the cartridge may be made so as to be able to receive handles of differing characteristics, without it being in any way different from the cartridge illustrated in FIG. 1 .

Figure 13:
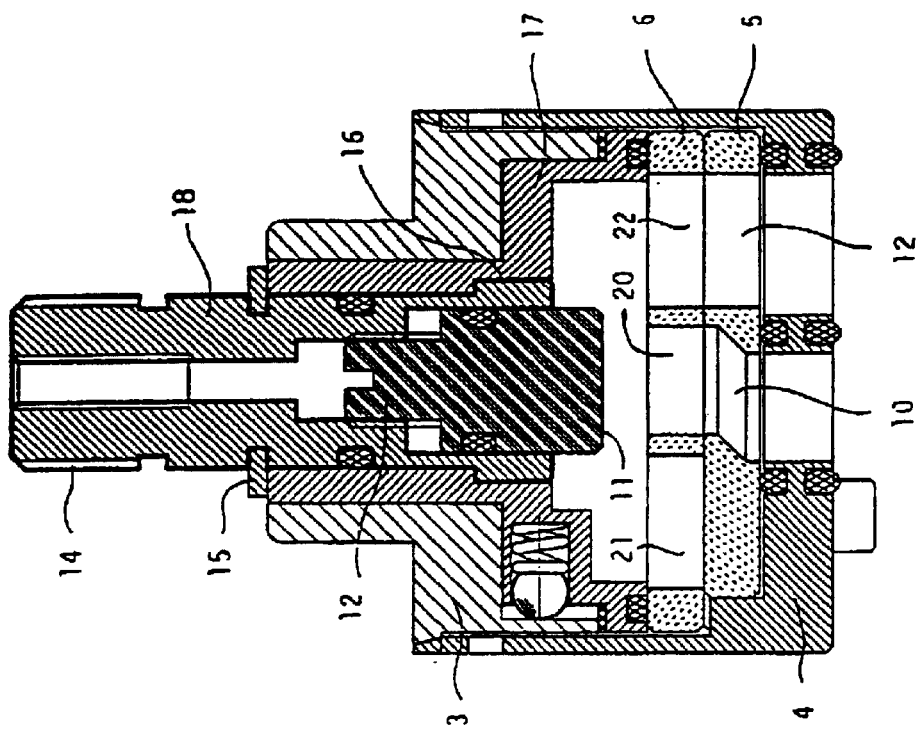
FIGS. 12 to 13 show in a similar way to FIG. 1 two other forms of embodiment of the delivery control as in the invention.

In FIG. 13, the control pin 18 has within it a plunger 11 which by means of a threaded part 12 may be arranged in an axially adjustable position opposite the central inlet passage aperture 20 of the moveable shutter plate 6, so as to limit the maximum value of the flow rate which can be delivered by the controller, when this limitation is required or imposed. In this case, the structural separation between the moveable element 17 and the control pin 18 enables devices to be made with or without the function referred to above, simply by substitution of the control pin, even when it is not necessary to differentiate the means of connection for the handle.

It must be understood that the invention is not limited to the forms of embodiment described and illustrated as examples. There are many modifications which can be made by a person qualified in this field, especially, as already explained, in the choice of the number and arrangement of the delivery passage , but also, for example, in regard to the structure and production of the internal means of connection 16 and the axial fixing of the control pin 18. It must also be understood that the limitation according to which the delivery apertures of the fixed shutter plate may not occupy an angle greater than ⅓ of the circle relates to the possibility of obtaining a position of interception; this limitation becomes less restricting if an interception position is not required.

These and other modifications and any substitution with equivalent techniques may be made to what has been described and illustrated without by so doing moving outside the sphere of the invention and the range of this patent.

What is claimed is:

1. Delivery control device, intended to allow control of the supply of various hydraulic apparatuses to achieve activation of these individually or in various combinations, characterized by the fact that it includes a pair of shutter plates, one fixed and one moveable, in which the fixed shutter plate offers several peripheral delivery passage apertures, each of which has essentially the form of a sector of a circle, while the moveable shutter plate offers a single peripheral delivery passage aperture, of a form essentially corresponding to that of one of the delivery passage apertures of the fixed shutter plate and, in a position at least approximately diametrically opposed to this single delivery passage aperture, a collective delivery passage aperture of a form essentially corresponding to the whole form of two or more delivery passage apertures adjacent to the fixed shutter plate.

2. Delivery control device as in claim 1, characterised by the fact that all the delivery passage apertures of the fixed shutter plate occupy no more than one third of the circle of the peripheral area of the fixed shutter plate.

3. Delivery control device as in claim 1, characterised by the fact that either the fixed shutter plate referred to or the moveable shutter plate each offer in addition a respective central inlet passage aperture.

4. Delivery control device as in claim 1, characterised by the fact that it offers mutual positioning of the two shutter plates by which the delivery may be intercepted, and that from this position and by rotating the moveable shutter plate in a given direction the delivery may be directed, in succession, individually to each of the delivery apparatuses, and then, still rotating the moveable shutter plate in the same direction, the delivery may be directed collectively to two or more delivery apparatuses, in a succession of pre-set combinations.

5. Delivery control device as in claim 1, characterised by the fact that the passage apertures of the fixed shutter plate referred to are crosswise.

6. Delivery control device as in claim 1, characterised by the fact that the passage apertures of the moveable shutter plate referred to are crosswise, and that the moveable shutter plate is connected to a rotating element consisting of a chamber which connects these passage apertures by establishing a seal to the exterior.

7. Delivery control device as in claim 1, characterised by the fact that the passage apertures of the moveable shutter plate referred to are not crosswise, or consist of hollows, and are connected to each other.

8. Delivery control device as in claim 1, characterised by the fact that, to make it easier for the user to find the various operating positions of the delivery control, it includes a trigger device acting between a rotating element together with the moveable shutter plate and a fixed body to stabilise the correct positions selected or some of these.

9. Delivery control device as in claim 1, characterised by the fact that it is achieved by mounting the parts directly in a body.

10. Delivery control device as in claim 1, characterised by the fact that it is made in the form of a cartridge intended to be introduced into the body of an apparatus.

11. Delivery control device as in claim 1 or 10, characterised by the fact that a rotating element together with the moveable shutter plate does not itself have a control pin, and offers instead a means of connection, and that a control pin is made separately from the rotating element and offers an internal means of connection, complementary to the means of connection offered by the rotating element, and an external means of connection appropriate for the requirements of a handle for which the cartridge controller is designed.

12. Device as in claim 11, characterised by the fact that the previously mentioned means of connection of the rotating element and the control pin consist of portions of not entirely circular section, especially splined or prismatic sections or circular sections interrupted by projections, hollows or level parts, these sections being liable, when they are used together, to transmit a rotating movement from the control pin to the internal rotating element.

13. Device as in claim 11, characterised by the fact that the control pin is designed to be inserted into the rotating element, during assembly of the device, from the interior towards the exterior.

14. Device as in claim 13, characterised by the fact that the control pin is fixed in its axial position by means of a fixing element, such as an elastic ring, inserted into the external part of the control pin after its connection with the rotating element.

15. Delivery control device as in claim 11, characterised by the fact that the control pin is also fixed axially by for purposes of means of connection with the rotating element.

16. Device as in claim 12, characterised by the fact that the means of connection offered by the rotating element, and/or the internal means of connection offered by the control pin are composed of a metal insert.

17. Device as in claim 16, characterised by the fact that a metal insert is formed when the plastic material of the rotating element is made.

18. Device as in claim 1, characterised by the fact that it includes a control pin capable of carrying out other functions in addition to that of transmitting the rotating movement from an external handle to an internal rotating element.

19. Device as in claim 18, characterised by the fact that the control pin contains within it a plunger which by means of a threaded part may be arranged in an axially adjustable position opposite the inlet passage aperture of the moveable shutter plate, for the purpose of regulating the maximum flow rate range which may be delivered by the delivery control.

* * * * *

UNITED STATES PATENT AND TRADEMARK OFFICE
CERTIFICATE OF CORRECTION

PATENT NO.     : 6,789,573 B2
DATED          : September 14, 2004
INVENTOR(S)    : Francesco Knapp It is certified that error appears in the above-identified patent and that said Letters Patent is hereby corrected as shown below:

Title page,
Item [30], Foreign Application Priority Data, "Mar. 7, 2002" should read -- Mar. 7, 2000 --.

Column 3,
Line 65, "apparatus:" should read -- apparatus; --.

Column 4,
Line 35, "been ambled the" should read -- been assembled, the --.

Column 6,
Line 67, "passage, but" should read -- passage apertures, but --.

Column 8,
Lines 14-16, "connection, and that a control pin is made separately from the rotating element and offers an internal means of connection, complementary" should read -- connection, complementary --.

Signed and Sealed this

Twenty-first Day of December, 2004

JON W. DUDAS
*Director of the United States Patent and Trademark Office*